UNITED STATES PATENT OFFICE.

JOSEPH A. AMBLER, OF NORWICH, CONNECTICUT, AND HARRY D. GIBBS, OF SAN FRANCISCO, CALIFORNIA.

PROCESS FOR THE MANUFACTURE OF BENZENE SULFONIC ACIDS.

1,300,228.  Specification of Letters Patent.  Patented Apr. 8, 1919.

No Drawing.   Application filed January 26, 1918.   Serial No. 213,977.

(DEDICATED TO THE PUBLIC.)

*To all whom it may concern:*

Be it known that we, JOSEPH A. AMBLER and HARRY D. GIBBS, citizens of the United States of America, employees of the Department of Agriculture of the said United States, residing in the city of Norwich, county of New London, State of Connecticut, and in the city of San Francisco, county of SanFrancisco, State of California, respectively, whose post-office address is Washington, D. C., have jointly invented a new and useful Process for the Manufacture of Benzene Sulfonic Acids.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to us of any royalty thereon. This invention is dedicated to the free use of the people of the United States.

Heretofore various methods for manufacturing the sulfonic acids of benzene have been employed, among which are the following:

(1) By adding the benzene to sulfuric acid or to sulfuric acid containing sulfur trioxid, under suitable temperature control and with various methods of agitation and mixing.

(2) By passing the vapors of benzene into a vessel of heated sulfuric acid.

We have found that benzene may be sulfonated in the gaseous state and the product removed rapidly from the reaction vessel, in a continuous and automatic manner.

We shall illustrate our invention by describing the process for the manufacture of benzene sulfonic acid.

Sulfuric acid of specific gravity 1.84 is caused to descend over baffle-plates, pebbles or coarse pumice stones, in a tower, which is heated and maintained at a temperature of 150° centigrade. Benzene is heated to boiling and its vapors are passed up through the tower. The vapors come into contact with the descending hot sulfuric acid and are absorbed by it, with the formation of water and benzene sulfonic acids. The water and unattacked benzene escape from the tower as vapors, which are condensed and the recovered benzene separated, dried and used again. The sulfonic acids, together with a slight excess of unused sulfuric acid, are carried downward by means of gravity, and discharged from the bottom of the tower.

Thus our invention is an improvement on existing methods of manufacture of benzene sulfonic acids, in that it is a continuous process and the products move in a continuous and automatic manner; also in that said products are removed rapidly from the influence of heat, and in that less sulfuric acid is required for the process.

It is obvious that other concentrations of sulfuric acid than that having specific gravity 1.84 may be used, that other temperatures than 150° may be used, and our invention is not restricted to such sulfuric acid or temperature, but has a general application to the sulfonation of benzene in the gaseous state.

Having thus described our invention, we claim—

1. A continuous process for the manufacture of sulfonic acids of benzene by causing the vapors of benzene to come into contact with a descending current of sulfuric acid, and continuously removing in the vapor phase the unacted on benzene and the water formed, and also continuously removing in the liquid phase the excess of sulfuric acid and the benzene sulfonic acids.

2. A continuous process for the manufacture of sulfonic acids of benzene by causing the vapors of benzene to come into contact with a descending current of sulfuric acid, heated and maintained at the temperature at which benzene boils, and continuously removing in the vapor phase the unacted on benzene and the water formed, and also continuously removing in the liquid phase the excess of sulfuric acid and the benzene sulfonic acids.

3. A continuous process for the manufacture of sulfonic acids of benzene by causing the vapors of benzene to come into contact with a descending current of sulfuric acid, heated and maintained at a temperature above that at which benzene boils, and continuously removing in the vapor phase the unacted on benzene and the water formed, and also continuously removing in the liquid phase the excess of sulfuric acid and the benzene sulfonic acids.

4. A continuous process for the manufacture of sulfonic acids of benzene by causing the vapors of benzene to rise through a tower in which a stream of sulfuric acid is descending over obstructions to break and retard its fall, and continuously removing in the vapor phase the unacted on benzene and the water formed, and also continuously removing in the liquid phase the excess of sulfuric acid and the benzene sulfonic acids.

5. A continuous process for the manufacture of sulfonic acids of benzene by causing the vapors of benzene to rise through a tower in which a stream of sulfuric acid, heated and maintained at the temperature at which benzene boils, is descending over obstructions to break and retard its fall, and continuously removing in the vapor phase the unacted on benzene and the water formed, and also continuously removing in the liquid phase the excess of sulfuric acid and the benzene sulfonic acids.

6. A continuous process for the manufacture of sulfonic acids of benzene by causing the vapors of benzene to rise through a tower in which a stream of sulfuric acid, heated and maintained at a temperature above that at which benzene boils, is descending over obstructions to break and retard its fall, and continuously removing in the vapor phase the unacted on benzene and the water formed, and also continuously removing in the liquid phase the excess of sulfuric acid and the benzene sulfonic acids.

In testimony whereof, we affix our signatures in the presence of two subscribing witnesses.

JOSEPH A. AMBLER.
HARRY D. GIBBS.

Witnesses:
L. A. SKINNER,
R. HELLBACH.